(12) United States Patent
Helmolt

(10) Patent No.: US 6,576,357 B1
(45) Date of Patent: Jun. 10, 2003

(54) POLYMER ELECTROLYTE MEMBRANE FUEL CELL SYSTEM AND METHOD FOR WETTING AND/OR COOLING A FUEL CELL STACK

(75) Inventor: Rittmar Von Helmolt, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 50 days.

(21) Appl. No.: 09/712,396

(22) Filed: Nov. 14, 2000

Related U.S. Application Data

(63) Continuation of application No. PCT/DE99/01293, filed on May 3, 1999.

(30) Foreign Application Priority Data

May 14, 1998 (DE) .......................................... 198 21 766

(51) Int. Cl.⁷ ................................................ H01M 8/00
(52) U.S. Cl. ............................ 429/13; 429/38; 429/39
(58) Field of Search .............................. 429/13, 38, 39

(56) References Cited

U.S. PATENT DOCUMENTS

| | | | |
|---|---|---|---|
| 3,061,658 A | 10/1962 | Blackmer | |
| 5,638,209 A | * 6/1997 | Okada et al. | 15/250.02 |
| 5,958,613 A | 9/1999 | Hamada et al. | |
| 5,991,670 A | * 11/1999 | Mufford et al. | 180/65.1 |
| 6,045,934 A | * 4/2000 | Enami | 429/13 |
| 6,259,971 B1 | * 7/2001 | Mitchell et al. | 423/439 |

FOREIGN PATENT DOCUMENTS

| | | |
|---|---|---|
| EP | 0 743 693 A1 | 11/1996 |
| JP | 05 036 428 A | 2/1993 |
| JP | 06 231 788 A | 8/1994 |
| JP | 07 263 010 A | 10/1995 |
| JP | 08 222 254 A | 8/1996 |

\* cited by examiner

Primary Examiner—Carol Chaney
Assistant Examiner—Dah-Wei Yuan
(74) Attorney, Agent, or Firm—Laurence A. Greenberg; Werner H. Stemer; Ralph E. Locher

(57) ABSTRACT

A polymer electrolyte membrane fuel cell system uses a wetting and/or cooling with a liquid medium. A liquid distributor is provided in one or both axial process gas supply lines. The liquid distributor uses acoustic waves for producing droplets directly in front of the gas inlet of each fuel cell unit of a fuel cell stack and feeds the droplets to the process gas flow.

11 Claims, 4 Drawing Sheets

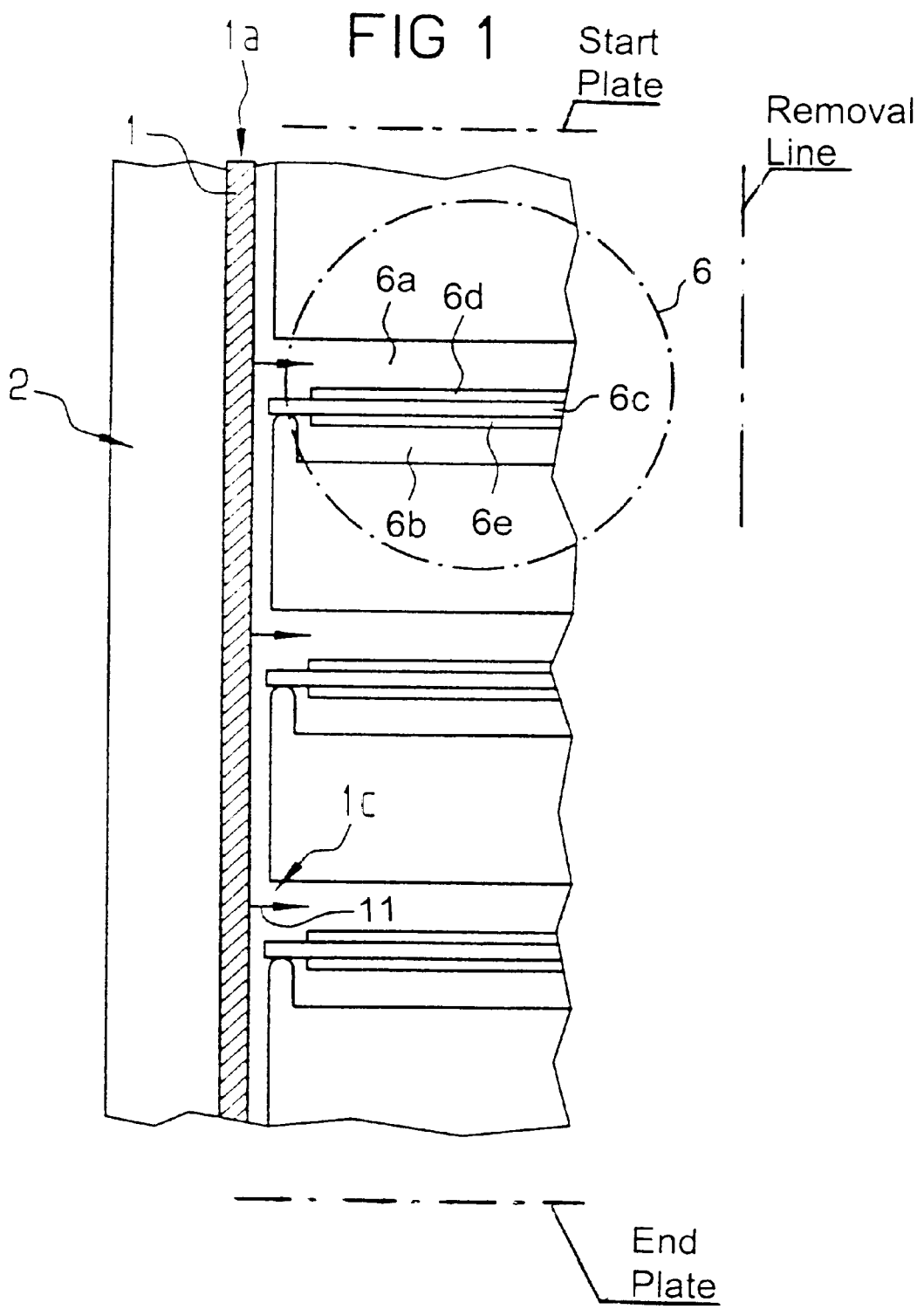

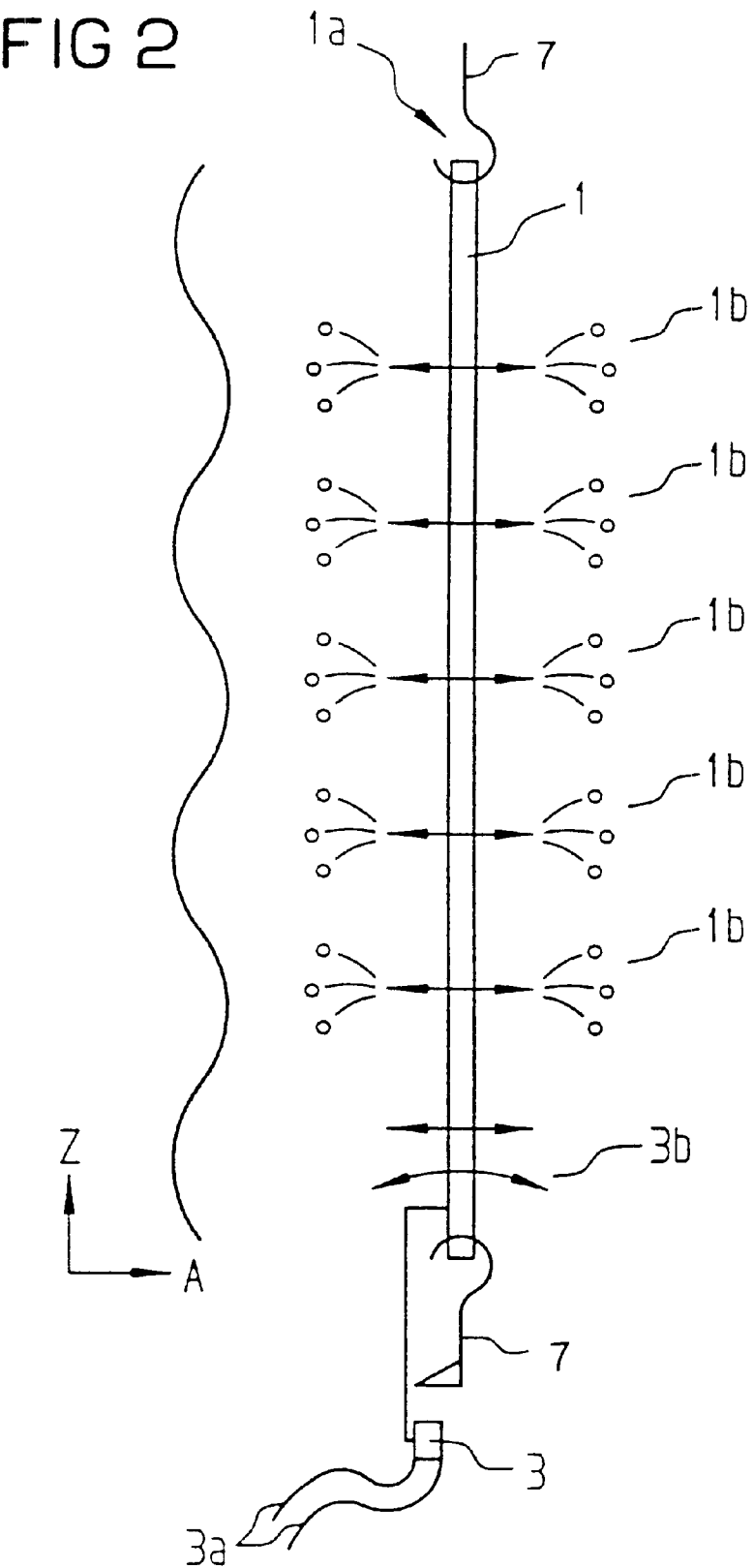

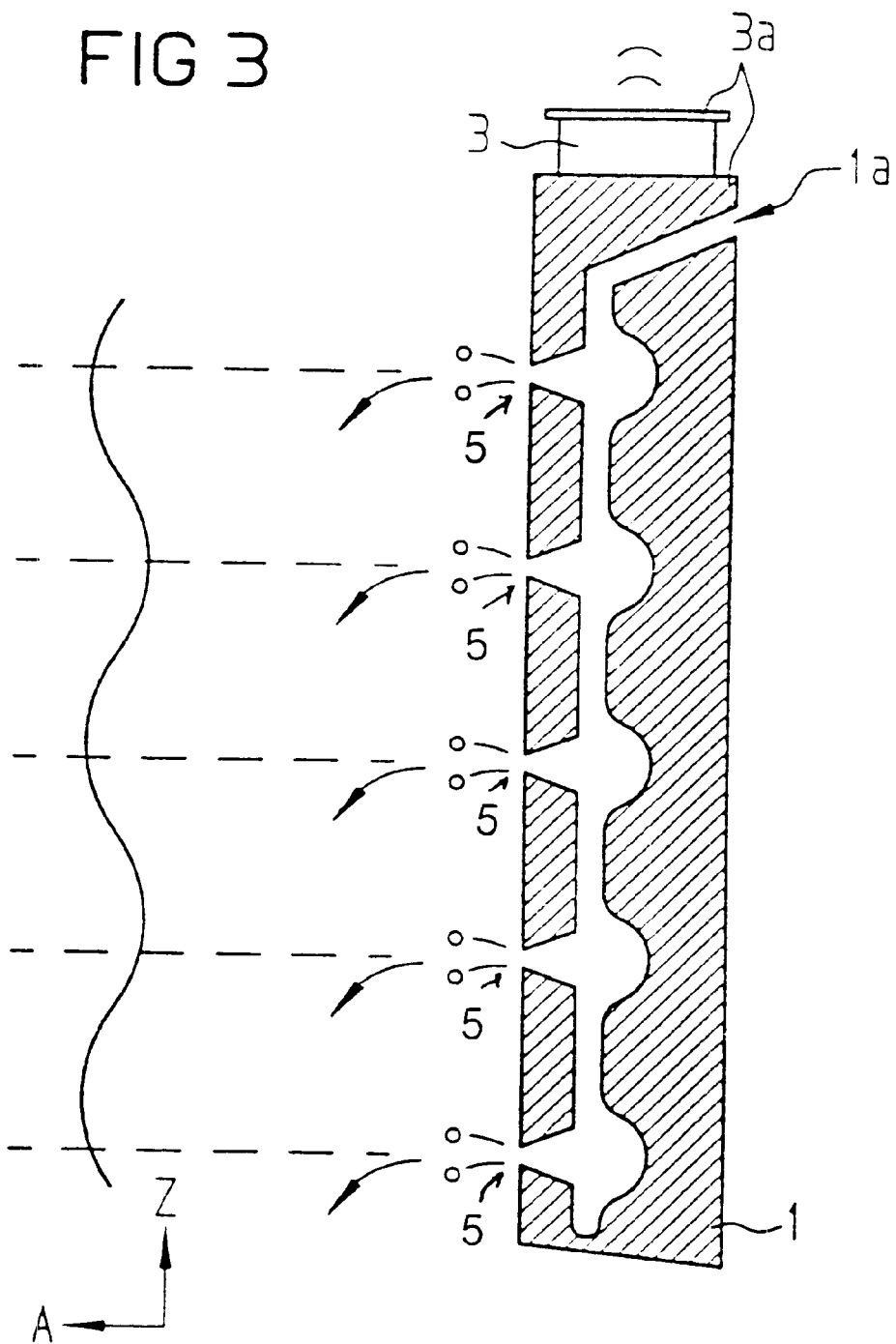

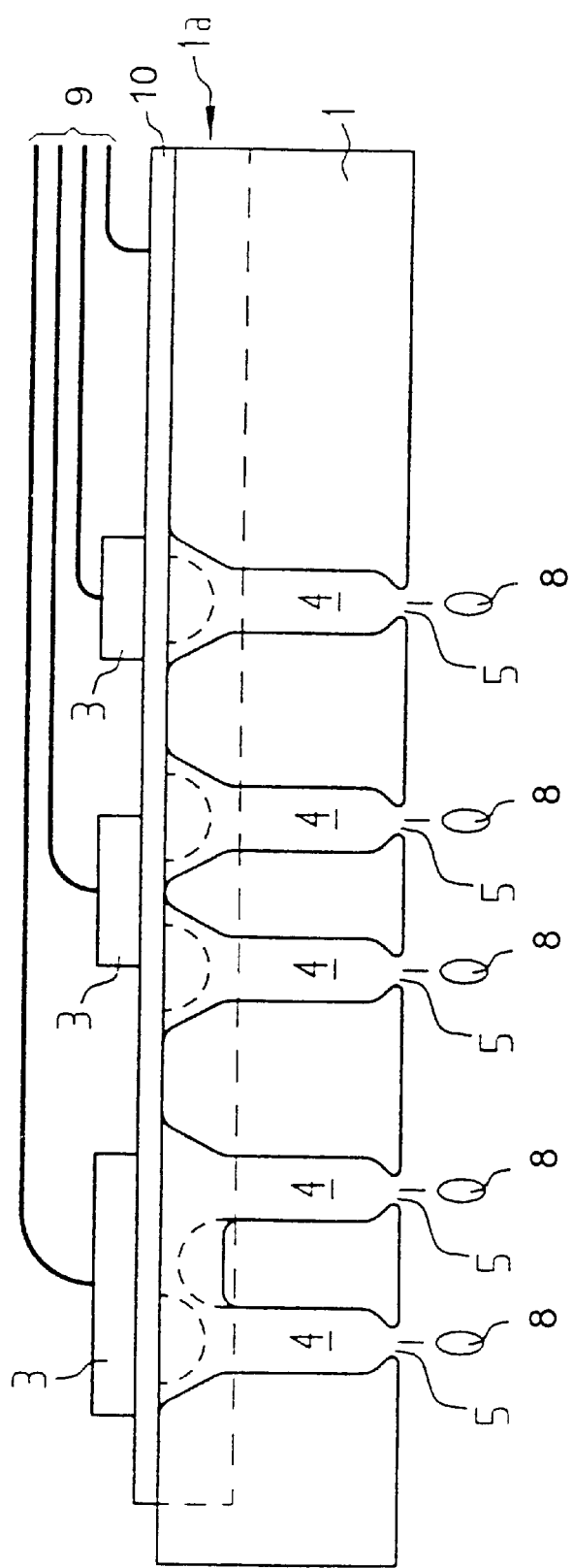

POLYMER ELECTROLYTE MEMBRANE FUEL CELL SYSTEM AND METHOD FOR WETTING AND/OR COOLING A FUEL CELL STACK

CROSS-REFERENCE TO RELATED APPLICATION

This application is a continuation of copending International Application No. PCT/DE99/01293, filed May 3, 1999, which designated the United States.

BACKGROUND OF THE INVENTION

FIELD OF THE INVENTION

The invention relates to a polymer electrolyte membrane (PEM) fuel cell system with a wetting and/or a cooling with a liquid medium. The polymer electrolyte membrane fuel cell system includes a fuel cell stack and a liquid distributor.

Published, Non-Prosecuted European Patent Application EP 0 743 693 A1, which corresponds to U.S. Pat. No. 5,958,613, discloses a fuel cell system with an anode-side liquid wetting. A gas/liquid mixture is produced with a bubbler, which is made from sintered metal. The bubbler extends over the entire length of the fuel supply line. For this purpose, the fuel gas is fed, via the bubbler, as bubbles into the liquid stream, which flows along the supply line. In the process, the liquid, which in this case is water, forms a coherent film. A disadvantage of this fuel cell system or other water-cooled fuel cell stacks is that water causes corrosion problems in the fuel cell stack. The high consumption of water and process gas is a further disadvantage of this type of wetting. This system is therefore also not suited for electrotraction, because large tanks have to be carried along. Furthermore, the water flow is such that it adequately cools the fuel cell system even in the case of power peaks. Consequently, when the system is used to drive a vehicle, the air stream is never utilised for cooling, which reduces the overall energy efficiency of the vehicle.

Published, Non-Prosecuted German Patent Application DE-A 196 41 143 discloses a wetted polymer electrolyte membrane (PEM) fuel cell in which water is supplied to the active cell faces in the form of drops which can be suspended as an aerosol in the process gas flow or the water can be supplied to the active cell faces through the use of a number of thin lines. In the latter case, there is no appreciable mixing of the gas and water phases in the process, and this reduces the free surface of the water, in other words, the "useful" surface of the water is reduced. A disadvantage of the first-mentioned alternative, that is to say the wetting with the aerosol, is the formation of suspended droplets which prematurely deposit along the feed lines and supply lines. Consequently, only a fraction of the water quantity used reaches the active cell face, and the overall result is an unbalanced wetting of the individual cells. The efficiency of the wetting, in view of the amount of water that is used, is low in both of the wetting and/or cooling systems described. In the case of the configuration with the plurality of thin lines for each active face, a high outlay for its construction is to be expected. This results in high production costs and an increased size and weight of the resulting fuel cell stack.

SUMMARY OF THE INVENTION

It is accordingly an object of the invention to provide a polymer electrolyte membrane (PEM) fuel cell system, in particular for mobile applications, which overcomes the above-mentioned disadvantages of the heretofore-known fuel cell systems of this general type and which achieves a uniform and balanced wetting and/or cooling in conjunction with a high efficiency of its water consumption and which can be implemented with the lowest possible constructional outlay, so that the weight and size of the fuel cell system are burdened as little as possible by the system for wetting and/or cooling with a liquid medium. The fuel cell system should furthermore be cost-effective in its production and should in particular be suited for mass production. It is a further object of the invention to provide a method for wetting and/or cooling a fuel cell stack of a fuel cell system which is suitable for mobile applications.

With the foregoing and other objects in view there is provided, in accordance with the invention, a polymer electrolyte membrane fuel cell system, including:

a fuel cell stack having a start plate, an end plate, and at least two fuel cell units disposed between the start plate and the end plate;

two supply lines connected to the fuel cell stack for supplying process gases to the fuel cell units;

two removal lines connected to the fuel cell stack; and a liquid distributor provided in at least one of the supply lines and disposed within the fuel cell stack; and at least one acoustic wave generator connected to the liquid distributor.

In other words, the subject matter of the invention is a polymer electrolyte membrane (PEM) fuel cell system which uses a wetting and/or cooling with a liquid medium and which includes the following elements:

at least two fuel cell units which, together with a start plate and an end plate, form a fuel cell stack, two supply lines for the process gases, and the respective removal lines, a liquid distributor, which is connected to at least one device for producing acoustic waves, is provided in at least one of the process gas supply lines inside the fuel cell stack.

According to a preferred embodiment of the invention, the device for producing acoustic waves, to which the liquid distributor is connected, generates a standing wave in the liquid distributor and/or into the liquid column in such a way that the standing wave in the liquid distributor and/or in the liquid column has an antinode at the level or height of the gas inlet of each fuel cell unit.

It is preferable to generate in the liquid distributor and/or in the liquid column a standing wave whose wavelength is such that one half of the wavelength corresponds to the spacing distance between two successive fuel cell units.

The device for producing acoustic waves preferably includes at least one piezo actor, which are for example used for producing extremely small droplets (cf. S. Brand and T. Laux: "Einsatzmöglichkeiten und -Bereiche von piezokeramischen Aktoren" ["Possible applications and fields of use of piezoceramic actors"], Volume 1 of the VDI series "Technologiestudien und Marktprognosen zur Mikrosystemtechnik" ["Technological studies and market forecasts for Microsystems technology"]).

The liquid distributor is an essential element of the invention and designates a component which can become saturated with a liquid medium and can be made to oscillate with an acoustic wave generator. This component is configured such that the latter can be accommodated in a process gas supply line without much constructional outlay, that is to say it should be capable of being inserted simply by being pushed or pulled into the process gas supply line.

Alternatively, the water distributor is formed from a plurality of pieces and is formed by stacking the fuel cell units when assembling the fuel cell stack.

The liquid distributor can be formed from any material which is suitable for transporting a liquid medium, for example textile (cotton, hemp) and/or plastic (for example nylon, glass fiber and/or carbon fiber and arbitrary mixtures thereof) and/or metal (for example iron, steel, etc.). The liquid distributor is accommodated in one or in both axial supply channel (channels) of a fuel cell stack, and is made to oscillate through the use of acoustic waves. Examples of the liquid distributor are a small tube, a wire, a wick or a hose filled with liquid medium in which an oscillating element, for example a wire, is located. In this case, the hose must be porous, having bores or nozzles through which the liquid medium can exit and be atomised by the oscillation of the hose.

Suitable as liquid medium are all liquids which are also suitable for the system disclosed in the simultaneously filed application entitled "Polymer Electrolyte Membrane Fuel Cell And Method For Operating a Polymer Electrolyte Membrane Fuel Cell System With Liquid Wetting And/Or Cooling" Ser. No. 09/712,395 (Attorney Docket No. GR 98 P 8040). It is preferred in this case to use water or water with additives such as surfactants or similar additives. The invention is not limited to water but includes all other liquid media suitable for cooling and/or wetting of the polymer electrolyte membrane of the fuel cell.

According to a preferred embodiment of the invention, the fuel cell stack is also air-cooled, that is to say in addition to the system according to the invention for cooling with the water for wetting, the fuel cell stack also has elements which permit air cooling, that is to say which use the airstream for cooling the fuel cell stack. Such elements are disclosed, inter alia, in International Publication No. WO 97/01827.

In accordance with a preferred feature of the invention, the polymer electrolyte membrane fuel cell system is used in combination with a vehicle that uses electrotraction. The polymer electrolyte membrane fuel cell system may however also be used in other applications for electrotraction and may of course be used in stationary applications.

With the objects of the invention in view there is also provided, a method for wetting and/or cooling a fuel cell stack, that includes the steps of:

producing, with acoustic waves, droplets of a liquid medium directly in front of a gas inlet of each fuel cell unit of a fuel cell stack;

adding the droplets of the liquid medium to a process gas flow; and guiding the liquid medium with the process gas flow onto active surfaces of the fuel cell stack.

In other words, the invention also provides a method for wetting and/or cooling a fuel cell stack, in which a liquid medium is guided with the process gas flow onto the active faces of the fuel cell stack, liquid droplets being produced with the aid of acoustic waves directly in front of the gas inlet of each fuel cell unit of the fuel cell stack and being added to the process gas flow.

According to a preferred mode of the invention, only one process gas flow, that is to say either the cathode gas flow or the anode gas flow, is wetted. It is particularly preferred in this case to wet or humidify the anode gas flow.

According to another mode of the invention, the amount of liquid introduced into the process gas flow for the purpose of wetting is sufficient for cooling the fuel cell stack.

According to an alternative embodiment, the electrode or electrodes and not the process gases are wetted or humidified.

A supply channel, which generally extends in an axial direction and through which the process gas flows to the individual fuel cell units (individual cells of the fuel cell stack), is designated as the process gas supply line (that is to say a fuel and/or oxidant supply and/or feed line) inside the fuel cell stack. In this case, each fuel supply line is connected to a fuel tank and each oxidant supply line is connected to an oxidant tank. Alternatively, the fuel supply line can also further or only be connected to a fuel reformer and/or the oxidant supply line can also further or only be connected to a condenser.

For the purpose of supplying the active cell faces or surfaces with process gas, each of these lines respectively has an opening which is designated as gas inlet at the level or height of the active face.

The liquid distributor is accommodated in the process gas supply line such that it impedes the process gas flow as little as possible.

If the liquid distributor needs a holder in the process gas supply line, it is possible at the start and at the end of the supply line respectively to provide at the level of the start and end plates of the fuel cell stack a simple bracket or a similar holding device into which the liquid distributor is clamped. It is equally possible to provide another type of holder or mechanical fixture.

The standing wave in the liquid distributor and/or in the liquid column forces the discharge or supply of droplets to each fuel cell unit. This is a result of the fact that an antinode of the liquid distributor and/or of the liquid column, which is located in front of the gas inlet of the cathode gas space and/or anode gas space, produces droplets which it hurls or ejects into the gas inlet. The quantity of the water emitted to the fuel cell units can also be controlled via the induced wave, for example via the amplitude or else via the pulse length (=length of the wave group) or pulse number (=frequency at which wave groups are produced). The control of the emitted water quantity is usually determined by the operating parameters of the fuel cell stack or the fuel cell battery, mainly by their gas throughput and operating temperature.

One embodiment of the invention couples a standing wave into the liquid distributor via an individual transmitter (actor, acoustic wave generator). In this case, the wavelength λ can be set by the properties of the water distributor and the frequency f of the acoustic wave. The following general relationship holds $$c = f * \lambda,$$

the phase velocity c of the acoustic wave being a function of the properties of the water distributor.

If, for example, a transverse wave (cf. FIG. 2) is to be coupled into the liquid distributor or the liquid column, according to a preferred embodiment of the invention, one half of the wavelength ($\lambda/2$) of the injected standing wave corresponds to the spacing of two adjacent gas inlets in a supply line. Each antinode produced is then placed precisely in front of a gas inlet of a fuel cell unit.

Likewise, it is also possible to inject or couple in a longitudinal wave (cf. FIG. 3). This longitudinal wave can also propagate in a liquid or gaseous medium, and therefore be injected or coupled directly into a liquid column or into a mist of liquid medium and process gas or into a foam. Likewise, a longitudinal wave can also be coupled into the liquid distributor or into both the liquid distributor and the liquid column. In some circumstances a given wavelength may be advantageous for injecting the longitudinal wave similar to the case of transverse waves. Both, standing longitudinal waves and standing transverse waves can also be provided with other wavelengths within the scope of this invention. Thus, a uniform distribution of the liquid medium over the active cell faces is even then provided, when the wavelength is much shorter than the spacing of two cells in the axial channel, or else much larger than the length of the axial channel. In both cases, the droplets are hurled off uniformly over the entire length of the liquid distributor.

Finally, a combination of longitudinal and transverse waves is also possible, and in this case a surface wave may be generated whose properties are a function of all the components of the liquid distributor including the liquid medium itself. The calculation and theoretical optimization is mathematically complicated, but may be solved with numerical methods.

It is preferred according to the invention for the antinodes to be produced directly in front of the gas inlets of the individual fuel cell units. This can be controlled by the geometrical dimensions, the wavelength and the above-mentioned setting of a frequency and a sound velocity in the liquid distributor.

The droplets form at the antinodes, directly in front of the gas inlets.

The acoustic wave is advantageously produced with piezoceramics, although other alternatives can of course equally be used to produce acoustic waves for the method according to the invention. Piezo elements such as piezo actors are preferred because they are distinguished by a simple configuration in combination with a high efficiency, and their application has been extensively tested with ultrasonic atomisers such as inkjet printers. Typical frequencies are 100 kHz and 2.5 MHz.

In a way similar to the technology as applied to inkjet printers or to the lubrication of machine tools, it is also conceivable to use pressure segments in the liquid distributor. For example, according to the invention use is made of piezoceramic pressure segments such as are used in injection systems for fuels in internal combustion engines or stationary heating systems for vehicles.

The configuration known from Published, Non-Prosecuted German Patent Application No. DE 44 42 285, which corresponds to U.S. Pat. No. 6,087,033, is used as a preferred configuration of a fuel cell stack. This configuration has the following layer structure in the fuel cell stack: separator (or intermediate element), cathode space (including catalyst layer and electrode), membrane, anode space (including catalyst layer and electrode), separator, separator, cathode space, membrane, etc., wherein a fuel cell unit includes a separator, a cathode space, a membrane, an anode space, and another separator. Should the cooling be performed solely via the wetting according to the invention, each second separator can be eliminated because a layer structure of: separator, cathode space, membrane, anode space, separator, cathode space, etc. suffices. However, it is preferred to use a "double-track" approach for the cooling, and so the fuel cell stack can basically be cooled via the wetting and by air. It is then left to the respective system management to decide when to cool more with liquid medium and when to cool more with gas, that is to say air, for example.

The cell face on which the process gas makes contact with one of the electrodes is denoted as active face.

Other features which are considered as characteristic for the invention are set forth in the appended claims.

Although the invention is illustrated and described herein as embodied in a polymer electrolyte membrane (PEM) fuel cell system with a wetting and/or cooling with a liquid medium, and a method for wetting and/or cooling a fuel cell stack, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, partial sectional view of a fuel cell stack of a fuel cell system according to the invention;

FIG. 2 is a schematic view of a liquid distributor according to the invention, during operation;

FIG. 3 is a diagrammatic sectional view of an embodiment of a liquid distributor formed with a tube or a groove; and FIG. 4 is a diagrammatic, sectional view of another embodiment of a liquid distributor, in which an acoustic wave generator is provided in front of each gas inlet.

DESCRIPTION OF THE PREFERRED EMBODIMENTS

Referring now to the figures of the drawings in detail and first, particularly, to FIG. 1 thereof, there are shown three fuel cell units of a fuel cell stack in cross section. The following is shown from left to right. The outer limiting wall of the axial fuel supply line 2 is shown on the far left. The fuel supply line 2 in each case has a gas inlet 1c at the level of the anode gas space 6a of each fuel cell unit 6. The liquid distributor 1 is accommodated in the fuel supply line 2. Liquid medium is supplied in the direction 11 to the liquid distributor, for example under pressure and/or via capillary force. Liquid is dispensed from or exits from the liquid distributor in the direction 11 at each gas inlet 1c. The droplets produced are hurled directly into the gas inlet (arrow direction 11).

A fuel cell unit 6 includes the electrolyte membrane 6c, which adjoins the anode 6d and the anode gas space 6a on one side, and the cathode 6e and the cathode gas space 6b on the other side.

The liquid distributor may just as well be accommodated in the oxidizing agent supply channel as in the fuel supply channel.

FIG. 2 shows the case of a liquid distributor 1 in operation, while a standing transverse wave is injected, for example via a piezo actor 3. Shown on the left of FIG. 2 is a graph of the amplitude A of the standing wave plotted against the distance Z from the acoustic wave generator.

A control voltage 3a is applied to the acoustic wave generator, for example at the piezo actor 3, so that the piezo actor 3 injects into the liquid distributor 1 via the mechanical fixture 7 an acoustic wave oscillating in the direction 3b.

As soon as the standing wave is coupled or injected into the liquid distributor 1, and liquid medium, for example water, is continuously fed to the liquid distributor, for example in the direction 1a, small droplets are produced at the antinodes 1b and are hurled off in the direction indicated by reference numeral 1b.

The mechanical fixture 7 can be implemented with any type of holder which holds the liquid distributor and at the same time does not impede the injection or generation of the oscillation.

If the liquid distributor is a wire or a wick, it is wetted via the supply line with water or some other liquid medium. Alternatively, a water-filled hose in which the oscillating wire is located can be provided. The hose is porous or has bores or nozzles through which the water can exit and is then atomised by the oscillation. The hose can be configured such that the pressure inside the hose is not the same as the operating pressure of the fuel cell, that is to say not equal to that in the supply line.

The wavelength $\lambda$ of a transverse wave in a steel wire is calculated using the relationship $$\lambda = c/f = 1/f\sqrt{(F/\rho*A)}$$

c being the phase velocity, f the frequency, F the force with which the wire is tensioned, $\rho$ the density of the wire material, and A the cross section of the wire. A wavelength of 1 mm is obtained for a steel wire with a cross section of 0.5 mm$^2$ and being tensioned with 50 N in the case of an injected frequency of 100 kHz, for example. Alternatively, a material with a lower density, such as nylon, glass fiber or carbon fiber, can be used for higher frequencies.

FIG. 3 shows the embodiment of the liquid distributor 1 implemented as a tube or with a channel or groove in which the liquid medium is distributed. Liquid medium which is made to oscillate with the aid of the acoustic wave generator 3 passes into the liquid distributor via the opening 1a. A control voltage 3a is applied to the acoustic wave generator 3. On the left side of FIG. 3, the amplitude A of the standing wave is plotted over the distance Z in order to show where antinodes are produced.

During the transmission of a longitudinal wave, the oscillation of the tube is coupled into the liquid medium. The exact form is determined in this case by the dimensions of the water distributor, which is determined, in turn, by the shape of the supply channel. The aim in this case is a large oscillation amplitude at the surface of the water which has the effect that with each oscillation a droplet (or a defined number of droplets) separates from each nozzle and is emitted to the gas inlet of the corresponding fuel cell unit. The wavelength for the longitudinal wave in the water distributor along the supply channel results from the relationship $$\lambda = c/f = 1/f\sqrt{(E/\rho)}$$

where E is the modulus of elasticity of the material, c the phase velocity, F the frequency, and $\rho$ the density of the wire material. A wavelength of approximately 2.5 mm results for steel, for example given a frequency of 2 MHz.

In the case of a tubular configuration, bores or nozzles 5 are provided at the spacing of the gas inlets. In the case of a tubular configuration, the standing wave can be injected into the liquid medium itself, the bores also being situated in this case such that there is a large oscillation amplitude (an antinode) at the exit location of the liquid medium.

FIG. 4 shows an embodiment in which a plurality of acoustic wave generators 3 located in each case at the level of a gas inlet are used to hurl droplets 8 from the liquid distributor 1 into the gas inlet.

The liquid distributor has a similar configuration as an inkjet printing array. As in FIG. 3, the liquid distributor has bores and/or nozzles 5, of which there is at least one provided at each gas inlet. Each of the nozzles has a pressure channel 4 in the liquid distributor, which is filled with liquid medium.

In this embodiment, at the level of each gas inlet there is a dedicated acoustic wave generator 3 with the aid of which droplets 8 are produced there from a pressure channel 4 of the liquid distributor 1 and added to the process gas flow.

The following is shown from top to bottom in FIG. 4. Lines 9 are provided with the aid of which an electric control voltage is applied from outside to the individual planar piezo actors 3. The planar piezo actors make the membrane 10 oscillate, which for its part passes the oscillation on to the liquid column in the pressure channel 4. The liquid medium passes via the liquid feed 1a, which preferably operates via capillary forces, into the liquid distributor 1, and from there respectively into the pressure channels 4. The pressure propagates inside each pressure channel up to the nozzle, where a droplet is emitted. In the case of water as liquid medium, droplet diameters are usually 40 to 120 $\mu$m, preferably 60 to 100 $\mu$m, and in particular 70 to 90 $\mu$m. The droplet diameter is limited in that without excitation of the piezo actor no water is to leave the nozzle, that is to say the surface tension of the water controls the simple outflow from the nozzle.

A parallel connection of all the piezo actors ensures that all the gas inlets are supplied with the same liquid quantity. However, if an individual voltage supply is selected, the quantity can be set individually for each fuel cell unit, and this can be advantageous, at least for a trial or experimental operation.

I claim:

1. A polymer electrolyte membrane fuel cell system, comprising:
    a fuel cell stack having a start plate, an end plate, and at least two fuel cell units disposed between said start plate and said end plate;
    two supply lines connected to said fuel cell stack for supplying process gases to said fuel cell units;
    two removal lines connected to said fuel cell stack;
    a liquid distributor provided in at least one of said supply lines and disposed within said fuel cell stack; and
    at least one acoustic wave generator connected to said liquid distributor for generating a standing wave having a given wavelength;
    said at least two fuel cell units being spaced apart from one another by a given distance equal to one half of the given wavelength.

2. The system according to claim 1, wherein said at least one acoustic wave generator generates a standing wave in said liquid distributor.

3. The system according to claim 1, wherein said at least one acoustic wave generator generates a standing wave in a liquid column.

4. The system according to claim 1, wherein said liquid distributor holds a liquid column and said at least one acoustic wave generator generates a standing wave in at least one of said liquid distributor and the liquid column.

5. The system according to claim 1, wherein said at least one acoustic wave generator includes at least one piezo-actor.

6. The system according to claim 1, wherein said liquid distributor is an element selected from the group consisting of a wick, a wire, a tube and a liquid-filled hose.

7. The system according to claim 1, wherein said fuel cell stack is an air-cooled fuel cell stack.

8. In combination with a vehicle using electrotraction, a polymer electrolyte membrane fuel cell system, comprising:
    a fuel cell stack having a start plate, an end plate, and at least two fuel cell units disposed between said start plate and said end plate;
    two supply lines connected to said fuel cell stack for supplying process gases to said fuel cell units;

two removal lines connected to said fuel cell stack;

a liquid distributor provided in at least one of said supply lines and disposed within said fuel cell stack; and at least one acoustic wave generator connected to said liquid distributor for generating a standing wave having a given wavelength;

said at least two fuel cell units being spaced apart from one another by a given distance equal to one half of the given wavelength.

9. A method for at least one of wetting and cooling a fuel cell stack having at least two fuel cell units spaced apart from one another by a given distance, the method which comprises:

producing, with acoustic waves having a wavelength equal to two times the given distance, droplets of a liquid medium directly in front of a gas inlet of each of the at least two fuel cell units;

adding the droplets of the liquid medium to a process gas flow being supplied to each of the at least two fuel cell units; and guiding the liquid medium with the process gas flow onto active surfaces of the fuel cell stack.

10. The method according to claim 9, which comprises adding the droplets of the liquid medium to only one of the process gas flows being supplied to the at least two fuel cell units.

11. The method according to claim 9, which comprises introducing a given quantity of the liquid medium into the process gas flow for wetting the fuel cell stack such that the given quantity of the liquid medium cools the f